Figure 1:
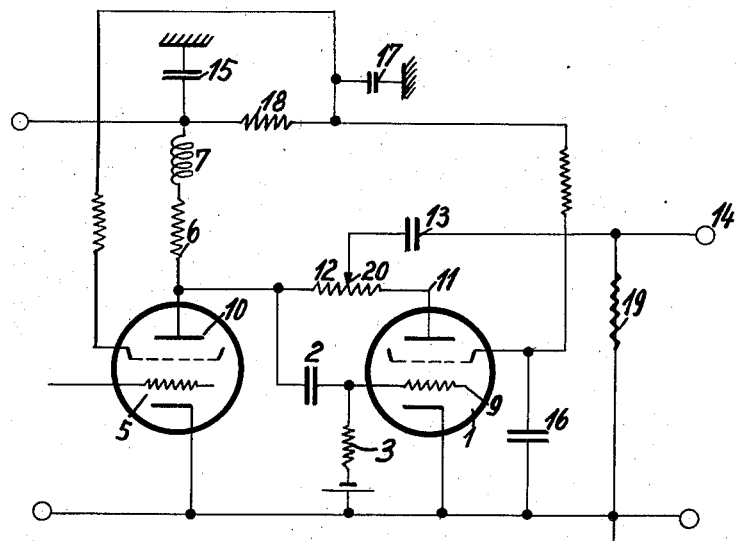

Oct. 5, 1937.　　　K. SCHLESINGER　　　2,094,678
DETECTOR FOR ULTRA SHORT WAVES
Original Filed March 26, 1934

Inventor:

Patented Oct. 5, 1937

2,094,678

UNITED STATES PATENT OFFICE 2,094,678

DETECTOR FOR ULTRA SHORT WAVES

Kurt Schlesinger, Berlin, Germany

Original application March 26, 1934, Serial No. 717,310. Divided and this application May 19, 1936, Serial No. 80,584. In Germany March 29, 1933

2 Claims. (Cl. 250—27)

The detector arrangements hitherto known are not capable of practical use in connection with very high modulating frequencies. When using these arrangements for television apparatus there is obtained a contrast reproduction which is weak and lacking in sharpness and also a veil in white. Furthermore, there arise distortions on the image screen if the carrier frequency still appears in the anode-circuit of the detector stage. In order to prevent this failure means are provided according to the invention which enable the carrier frequency to be compensated fully without loss of amplitude even if the same is in a ratio of merely 2:1 to the extreme wave of the useful frequency.

It has been found that the first error referred to is due to the fact that the charging period in the case of technical tubes is by no means sufficiently short, so that losses in amplitude occur in the order of 1:1,000 and the peak potential is not reached. The veil formation is due to a too slow discharge.

According to the invention, the elements of the arrangement are dimensioned in such fashion that the periods of charge and discharge are smaller than or at the most equal to the period of oscillation of the extreme frequency to be transmitted (maximum frequency, for example, in the case of a 180-line image 540 k. c.).

The charging period $\tau_L$ is proportional to the product of $R_{ig}$ (equivalent resistance of the grid path) and the total capacity (i. e., the total of coupling capacity and grid cathode capacity).

For example in the transmission of a 180-line image (extreme frequency 540 k. c.) there results according to the invention $$\tau_L \leq \frac{1}{540 \text{ kc}} \approx 2 \text{ msec}$$

In order to attain this extremely short charging period the total capacity, in accordance with the invention, is reduced as far as possible.

Taking as a basis the known tubes there results in accordance with the invention a maximum permissible total capacity of $5.5 \cdot 10^{-6}$ to $1.1 \cdot 10^{-5}$ mf.

In order to obtain the greatest possible degree of efficiency this total capacity, in accordance with the invention, is distributed in such fashion that the grid cathode capacity is made as small as possible and the capacity of the coupling condenser as large as possible.

Tubes are accordingly employed having separate lead-in connections for the grids at the top of the tube (so-called Horn type, having a cathode-grid capacity of: $C_{gk} = 3.3 \cdot 10^{-6}$ to $4.4 \cdot 10^{-6}$ mf.), and the coupling condenser selected at merely $2.2 \cdot 10^{-6}$ to $6.6 \cdot 10^{-6}$ mf.

The discharge period is proportional to the product of grid leak resistance and total capacity. According to the invention, there is selected $$\tau_E \leq \frac{1}{f_{\max}}$$

For television receiving apparatus for the reception of 180-line images there results in this connection according to the invention, taken on a basis of the extreme capacity necessary for attaining the period of charge, $R_g \sim 10^5$ ohms.

Figure 2:
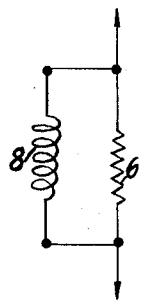
Figure 3:
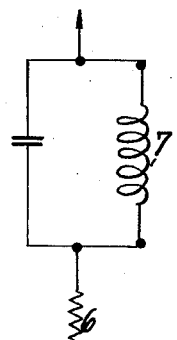

A form of embodiment of the invention is illustrated by way of example in the drawing, in which Fig. 1 shows a detector-circuit arrangement according to the invention, Figs. 2 and 3 show two forms for the frequency raising means in the anode-circuit of the valve 10.

In the drawing 1 is the screening grid audion with passed-out grid lead, 2 the coupling condenser, which in accordance with the invention is selected at $2.2 \cdot 10^{-6}$ to $6.6 \cdot 10^{-6}$ mf. (for an extreme frequency amounting to 540 k. c.), and 3 the grid leak resistance, which possesses a value of approximately $10^5$ ohms, 5 is the intermediate frequency amplifier tube, in the anode circuit of which there is provided the anode resistance 6 with the series-connected choke 7, which may also be replaced by a choke 8 or another suitable high-frequency impedance (see Figs. 2 and 3). The grid 9 of the audion detector valve is connected through the medium of the coupling condenser 2 with the anode 10 of the tube 5. The anode 11 of the detector valve is also connected with the anode 10 through the medium of the resistance 12. The rectified potential is taken up by the resistance 12 over the condenser 13 at the terminal 14.

The single elements may be selected as follows: The condenser 15 at $10^4$ cm., the condenser 13 at .1 m. f., the condensers 16 and 17 at 1 m. f., the resistances 6 and 18 each at 5000 ohms, the resistance 12 at 3000 ohms, the resistance 3 at $10^5$ ohms, and the resistance 19 at 0.5 megohm. These dimensions are however only given as examples, the values may be adapted to other ranges if necessary.

The operation of the arrangement is as follows: To the resistance 12 there is conducted by the anode 10 the carrier frequency and by the anode 11 the amplified counter-phasic carrier frequency and the rectified useful frequency. By correct adjustment of the tap 20 it may be accomplished without difficulty that the carrier frequency is fully compensated.

The arrangement according to the invention enables a rectification of all frequencies from 25 periods up to 540 k. c. to be accomplished with good degree of efficiency, and at the same time to eliminate fully by compensation the merely very little shorter wave length of the carrier wave (for example 200 or 250-metre wave).

I claim:

1. In a television receiving system a grid-leak detector arrangement for the rectification of carrier frequencies modulated with television frequencies comprising an input amplifier valve amplifying the carrier frequencies, a grid leak detector valve and means for completely compensating the carrier frequency from said television frequencies occurring in the anode circuit of said detector valve, including a potentiometer resistance arranged between the anode of said input amplifier valve and the anode of said after-connected grid-leak detector valve, and an output circuit connected to a tapping point on said resistance, said tapping point being adjusted for completely compensating the carrier frequency in the output of said detector valve.

2. In a television receiving system a grid-leak detector arrangement for the rectification of carrier frequencies modulated with television frequencies comprising an input amplifier valve amplifying the carrier frequencies, a grid leak detector valve, a potentiometer resistance arranged between the anode of said input amplifier valve and the anode of said after-connected grid leak detector valve for completely compensating the carrier frequency from said television frequencies occurring in the anode circuit of said detector valve, an output circuit connected to a tapping point on said resistance, a condenser and a grid-leak resistance in the grid-circuit of said detector valve, the total capacity of said detector arrangement with the inclusion of the electrode capacities amounting to a maximum capacity of $1.1 \cdot 10^{-5}$ mf., and a grid leak resistance having a value of approximately $10^5$ ohms, said detector valve being constructed to have a grid cathode capacity of approximately $3.3 \cdot 10^{-6}$ mf. to $4.4 \cdot 10^{-6}$ mf., said condenser having a capacity of approximately $2.2 \cdot 10^{-6}$ to $6.6 \cdot 10^{-6}$ mf.

KURT SCHLESINGER.